US011212396B2

(12) United States Patent
Kubo

(10) Patent No.: US 11,212,396 B2
(45) Date of Patent: Dec. 28, 2021

(54) OPERATION SETTING SELECTION APPARATUS, IMAGE FORMING APPARATUS, AND OPERATION SETTING SELECTION METHOD

(71) Applicant: KONICA MINOLTA, INC., Tokyo (JP)

(72) Inventor: Naoto Kubo, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/001,873

(22) Filed: Aug. 25, 2020

(65) Prior Publication Data
US 2021/0067637 A1 Mar. 4, 2021

(30) Foreign Application Priority Data
Aug. 26, 2019 (JP) .............................. JP2019-153377

(51) Int. Cl.
*H04N 1/00* (2006.01)
(52) U.S. Cl.
CPC ..... *H04N 1/00087* (2013.01); *H04N 1/00037* (2013.01); *H04N 1/0097* (2013.01); *H04N 1/00408* (2013.01)
(58) Field of Classification Search
None
See application file for complete search history.

(56) References Cited

U.S. PATENT DOCUMENTS

| 2006/0088323 | A1* | 4/2006 | Morisawa | G03G 15/5012 399/21 |
| 2007/0057426 | A1* | 3/2007 | Tao | G03G 15/6582 270/58.09 |
| 2008/0044191 | A1* | 2/2008 | Akazawa | G03G 15/5087 399/45 |
| 2008/0172401 | A1* | 7/2008 | Nishiyama | G06Q 10/10 |
| 2017/0259590 | A1* | 9/2017 | Itoh | B41J 13/0054 |

FOREIGN PATENT DOCUMENTS

JP 2009075153 A 4/2009

* cited by examiner

*Primary Examiner* — Frantz Bataille
(74) *Attorney, Agent, or Firm* — Buchanan Ingersoll & Rooney PC

(57) ABSTRACT

An operation setting selection apparatus includes, a physical property obtainer which obtains physical property information of a recording medium on which an image is formed; and a hardware processor. The hardware processor obtains from first information, in which operation failure information regarding contents of operation failure which occurs when an image forming operation is performed is associated to the physical property information of the recording medium used when the operation failure occurs and the operation setting regarding the image forming, the operation setting and the operation failure information associated to the physical property information obtained by the physical property obtainer. The hardware processor performs operation regarding selection of the operation setting regarding the image forming operation on the recording medium based on the physical property information, the operation setting and the operation failure information which are obtained.

15 Claims, 9 Drawing Sheets

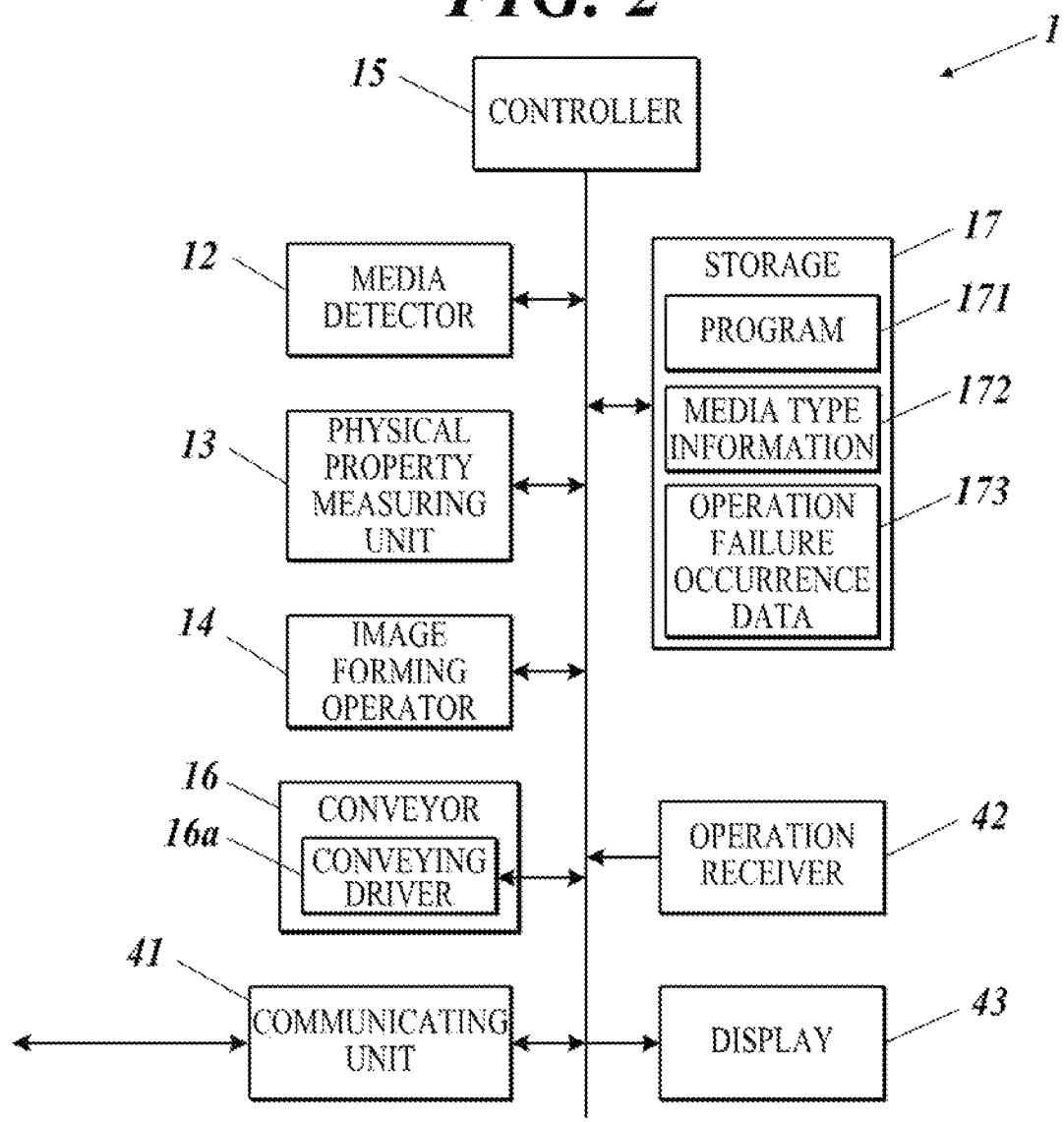

FIG. 4A

| SHEET TRAY | PLEASE SELECT DESIRED PROFILE FOR TRAY AND PRESS OK |
|---|---|

SHEET TYPE CANDIDATE LIST

| SETTING ID | BRAND | SHEET TYPE | BASIS WEIGHT | | |
|---|---|---|---|---|---|
| 0001 | A COMPANY ○ | | | | |
| 0002 | A COMPANY ○ | | | | |
| 0003 | A COMPANY ○ | | | | |
| 0004 | A COMPANY ○ | | | | |
| 0005 | B COMPANY ○ | | | | |
| 0006 | B COMPANY ○□○□-S | A4 | HIGH QUALITY SHEET | 81-91 | NONE |
| 0007 | B COMPANY ○□△□-XS | NO SPECIFICATION | COATED SHEET M | 102-124 | NONE |

PLEASE MEASURE SHEET WITH MEDIA SENSOR
CANDIDATE NARROWING FUNCTION CAN BE USED

[CANCEL] [OK]

Trays: TRAY 1, TRAY 2, TRAY 3, TRAY 4, TRAY 5, TRAY 6

1/50

[CANCEL] [OK]

FIG. 4B

| SHEET TRAY | PLEASE SELECT DESIRED PROFILE FOR TRAY AND PRESS OK |
|---|---|

SHEET TYPE CANDIDATE LIST

| SETTING ID | BRAND | SHEET TYPE | BASIS WEIGHT | FAILURE IMAGE RATE | JAMMING RATE | TOTAL NUMBER OF OUTPUT SHEETS |
|---|---|---|---|---|---|---|
| 0001 | A COMPANY ○○○○ | COATED SHEET M | 81-90 | 0.13 | 0.63 | 800 |
| 0012 | B COMPANY ○△△○ | HIGH QUALITY SHEET | 75-80 | 0.20 | 1.00 | 500 |
| 0003 | A COMPANY ○○○○-XI | COATED SHEET M | 75-80 | 0.20 | 0.30 | 2000 |
| 0041 | C COMPANY ○□○□-SF | COATED SHEET M | 75-80 | 2.50 | 2.50 | 40 |

Trays: TRAY 1, TRAY 2, TRAY 3, TRAY 4, TRAY 5, TRAY 6

[CANCEL] [OK]

FIG. 6

| SHEET TRAY | PLEASE SELECT DESIRED PROFILE FOR TRAY AND PRESS OK | | | | | | |
|---|---|---|---|---|---|---|---|
| | SHEET TYPE CANDIDATE LIST | | | | | | |
| TRAY 1 | SETTING ID | BRAND | SHEET TYPE | BASIS WEIGHT | FAILURE IMAGE RATE | JAMMING RATE | TOTAL NUMBER OF OUTPUT SHEETS |
| TRAY 2 | 0001 | A COMPANY ○○○○ | COATED SHEET M | 81-90 | 0.13 | 0.63 | 800 |
| TRAY 3 | 0002 | A COMPANY ○○△△ | NORMAL SHEET | 75-80 | 0.20 | 1.00 | 500 |
| TRAY 4 | 0003 | A COMPANY ○○○○-XI | COATED SHEET M | 75-80 | 0.20 | 0.30 | 2000 |
| TRAY 5 | 0004 | A COMPANY ○△○△-F | HIGH QUALITY SHEET | 75-80 | 2.50 | 2.50 | 40 |
| TRAY 6 | 0005 | S COMPANY ○□○□ | NORMAL SHEET | 75-80 | 0.20 | 1.00 | 500 |
| | 0006 | S COMPANY ○□○□-S | HIGH QUALITY SHEET | 81-90 | --- | --- | 0 |
| | 0007 | S COMPANY ○□△□-XS | COATED SHEET M | 102-124 | 0.00 | 1.00 | 100 |

▲ 1/50 ▼    CANCEL    OK

FIG. 7A

| SHEET TRAY | PLEASE SELECT DESIRED PROFILE FOR TRAY AND PRESS OK | | | | | | |
|---|---|---|---|---|---|---|---|
| TRAY 1 | SHEET TYPE CANDIDATE LIST | | | | | | |
| TRAY 2 | SETTING ID | BRAND | SHEET TYPE | BASIS WEIGHT | FAILURE IMAGE RATE | JAMMING RATE | TOTAL NUMBER OF OUTPUT SHEETS |
| TRAY 3 | 0003 | A COMPANY ○○○○ | COATED SHEET M | 81~90 | 0.13 | 0.63 | 800 |
| TRAY 4 | 0012 | B COMPANY ○△△○ | HIGH QUALITY SHEET | 75~80 | 0.20 | 1.00 | 500 |
| TRAY 5 | 0104 | A COMPANY ○○○○-X1 | COATED SHEET M | 75~80 | 0.20 | 0.30 | 2000 |
| TRAY 6 | 0041 | C COMPANY ○□○□-SF | COATED SHEET M | 75~80 | 2.50 | 2.50 | 40 |

[ PRIORITY ON QUALITY ] [ PRIORITY ON EFFICIENCY ] [ RECOMMENDED SETTING ]

[ CANCEL ] [ OK ]

FIG. 7B

| SHEET TRAY | PLEASE SELECT DESIRED PROFILE FOR TRAY AND PRESS OK | | | | | | |
|---|---|---|---|---|---|---|---|
| TRAY 1 | SHEET TYPE CANDIDATE LIST | | | | | | |
| TRAY 2 | SETTING ID | BRAND | SHEET TYPE | BASIS WEIGHT | FAILURE IMAGE RATE | JAMMING RATE | TOTAL NUMBER OF OUTPUT SHEETS |
| TRAY 3 | 0003 | A COMPANY ○○○○ | COATED SHEET M | 81~90 | 0.13 | 0.63 | 800 |
| TRAY 4 | 0012 | B COMPANY ○△△○ | HIGH QUALITY SHEET | 75~80 | 0.20 | 1.00 | 500 |
| TRAY 5 | 0104 | A COMPANY ○○○○-X1 | COATED SHEET M | 75~80 | 0.20 | 0.30 | 2000 |
| TRAY 6 | 0041 | C COMPANY ○□○□-SF | COATED SHEET M | 75~80 | 2.50 | 2.50 | 40 |

[ PRIORITY ON QUALITY ] [ PRIORITY ON EFFICIENCY ] [ RECOMMENDED SETTING ]

[ CANCEL ] [ OK ]

OPERATION SETTING SELECTION APPARATUS, IMAGE FORMING APPARATUS, AND OPERATION SETTING SELECTION METHOD

CROSS-REFERENCE TO RELATED APPLICATIONS

The entire disclosure of Japanese Patent Application No 2019-153377 filed on Aug. 26, 2019 is incorporated herein by reference in its entirety.

BACKGROUND

Technological Field

The present invention relates to an operation setting selection apparatus, an image forming apparatus, and an operation setting selection method.

Description of the Related Art

There is an image forming apparatus in which color material is applied to a recording medium (media) and an image is formed. The state of permeating, spreading, and fixing of the color material is different depending on the characteristic of the recording medium. When image forming is performed with an unsuitable operation setting (operation profile), not only does image quality decrease, but also the recording medium is not conveyed suitably. Then, trouble occurs such as the recording medium wrapping around the conveying roller, or jamming occurring. Therefore, operation setting is performed according to the characteristic of the recording medium when the image is formed.

Humidity also influences such wrapping and jamming JP 2009-75153 discloses a technique in which the number of times that jamming of the recording medium occurs is stored in the operation profile stored in advance, and in the operation profile in which trouble occurs, dehumidification is performed to suppress trouble.

However, there are various types of recording media, and new products or modified products are often used. In such case, it is difficult to store the operation settings for all recording media, and a similar operation setting is used instead. In such case, due to a slight difference in the characteristics, even if the same operation settings are made, the occurrence of trouble greatly changes depending on the recording medium actually used instead of the recording medium intended for the operation setting. Therefore, trouble cannot be suitably suppressed.

SUMMARY

An object of the present invention is to provide an operation setting selection apparatus, an image forming apparatus and an operation setting selection method in which trouble regarding recording media can be suitably suppressed.

To achieve at least one of the abovementioned objects, according to an aspect of the present invention, an operation setting selection apparatus reflecting one aspect of the present invention, the apparatus includes a physical property obtainer which obtains physical property information of a recording medium on which an image is formed; and a hardware processor, wherein, the hardware processor obtains from first information, in which operation failure information regarding contents of operation failure which occurs when an image forming operation is performed is associated to the physical property information of the recording medium used when the operation failure occurs and the operation setting regarding the image forming, the operation setting and the operation failure information associated to the physical property information obtained by the physical property obtainer, and the hardware processor performs operation regarding selection of the operation setting regarding the image forming operation on the recording medium based on the physical property information, the operation setting and the operation failure information which are obtained.

According to another aspect, an image forming apparatus includes, an operation setting selection apparatus according, and a forming operator which forms an image on a recording medium with a selected operation setting.

According to another aspect an operation setting selection method in which an operation setting for an image forming apparatus is selected according to a recording medium in which an image is formed, the method includes, obtaining physical property information of the recording medium, obtaining, from first information in which operation failure information regarding contents of operation failure which occurs in the image forming operation is associated to the physical property information of the recording medium used when the operation failure occurs and operation setting regarding image forming, the operation setting and the operation failure information associated with the obtained physical property information, and performing operation regarding selection of the operation setting regarding the image forming operation on the recording medium based on the physical property information, the operation setting, and the operation failure information which are obtained.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein:

FIG. 2 is a block diagram showing a functional configuration of an image forming apparatus;

FIG. 3 is a table showing an example of operation failure occurrence data;

FIG. 4A and FIG. 4B are diagrams showing an example of a display screen regarding operation setting;

FIG. 6 is a diagram showing a modification of a first display screen of the operation setting;

FIG. 7A and FIG. 7B are diagrams showing a modification of a display screen after narrowing media type;

DETAILED DESCRIPTION OF EMBODIMENTS

Hereinafter, one or more embodiments of the present invention will be described with reference to the drawings. However, the scope of the invention is not limited to the disclosed embodiments.

Figure 1:
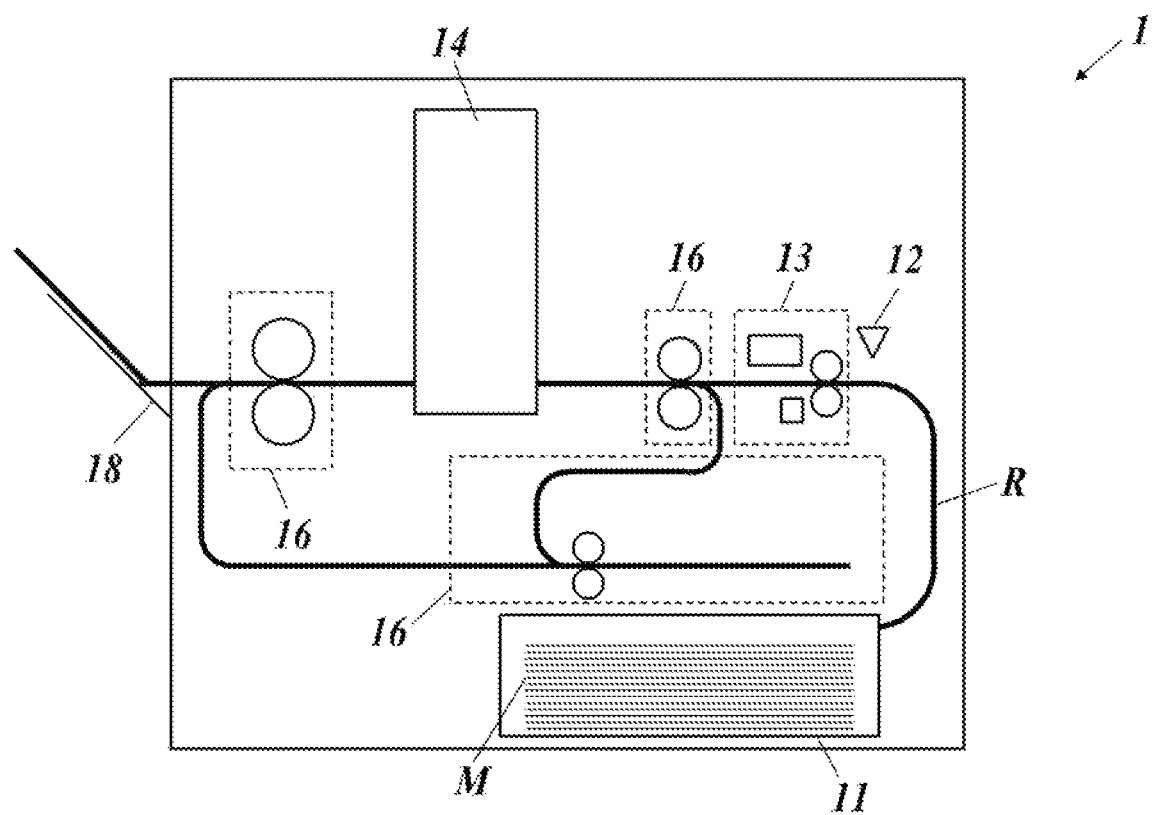
FIG. 1 is a schematic diagram showing an entire configuration of an image forming apparatus according to the present embodiment.

FIG. 1 is a schematic diagram showing an entire configuration of an image forming apparatus 1 (also operates as an operation setting selection apparatus) according to the present embodiment.

The image forming apparatus 1 applies color material to media M (recording medium) and forms an image. For example, the image forming apparatus 1 employs the electro-photographic method to attach and fix toner to the media M. The image forming apparatus 1 includes a media supplier 11, a media detector 12, a physical property measuring unit 13 (measuring unit, physical property obtainer), image forming operator 14 (forming operator), controller 15 (see FIG. 2), conveyor 16, and ejecting tray 18.

The media supplier 11 includes a tray and holds the media M which are to be the image forming target. According to control by the controller 15, the media supplier 11 sends the media M at a suitable timing to a conveying path R. A plurality of trays may be provided and the media M may be selectively supplied from a tray specified in an operation setting process. The conveyor 16 moves the media M along the conveying path R at a set speed. The conveyor 16 includes rollers which pinch the media M to advance the media M and a rotating motor which rotates the above rollers. The conveyor 16 includes an invertor which inverts the front and the back of the media M on which an image is formed on one side to form an image again.

The media detector 12 detects the media M moving on the conveying path R by the conveyor 16 at a predetermined position, here a position which is a predetermined distance before an image forming position where the image is formed by the image forming operator 14. For example, an optical sensor (photodiode, etc.) is used as the media detector 12. The optical sensor detects whether the media M exists by light being cut by the media M or detects whether the media M reached the predetermined position according to change in detected strength of reflected light due to whether the media M exists. Based on the timing that the front tip of the media M is detected by the media detector 12 and the conveying speed by the conveyor 16, the image forming timing by the image forming operator 14 is controlled, and the image is formed in a suitable position on the media M.

The physical property measuring unit 13 measures (obtains) predetermined physical quantity (physical property value) regarding the physical properties of the media M. The obtainable physical property as the target of measurement includes, basis weight, sheet thickness, and surface smoothness, for example. Sheet thickness is measured by, for example, displacement rollers which detect an interval between axes of two rollers which can be moved in a thickness direction according to the thickness of the media M. For example, by using a reflection sensor which outputs strength of a regular reflection light and scattered reflection light of irradiated light (for example, a mix of infrared light and visible light at a predetermined wavelength) and/or strength ratio of the above, the smoothness can be obtained based on the above strength ratio. The basis weight may be detected using a result of a weight sensor which directly measures weight of the media. The physical property measuring unit 13 may be able to measure some or all of the physical property values such as density, air permeability, friction coefficient, whiteness, rigidity, electric resistance, etc. The basis weight can be obtained by a combination of the above measured values.

The measurement operation by the physical property measuring unit 13 is performed in a plurality of positions of the media M while pausing the movement of the media M every predetermined distance, and the result of calculating processes such as the average of the obtained plurality of values is used as the final physical property value.

The physical property measuring unit 13 is not limited to a unit provided inside the image forming apparatus 1, and according to necessity, may be a unit which is attached and provided externally to be operable. In this case, the image forming apparatus 1 can be provided with a connector for wiring which can supply power to the physical property measuring unit 13 and which can transmit and receive signals between the physical property measuring unit 13. The controller 15 includes a driver regarding the control of operation of the connector and in this case, the controller 15 functions as the physical property measuring unit.

The image forming operator 14 includes an image forming engine (print engine) which attaches and fixes color material such as toner and ink on the media M to form an image on the media M. The image forming operator 14 is not limited and for example, the toner images in the four colors of CMYK can be formed (developed) on a photoreceptor by an electro-photographic method, and here, the image is transferred on the media M by a transfer body to form the color image.

The media M which is sent out by the media supplier 11 and moved on the conveying path R is ejected by the ejecting tray 18. A post processing apparatus which performs various post processing such as drying, cutting and sorting may be connected before the ejecting tray 18.

FIG. 2 is a block diagram showing a functional configuration of the image forming apparatus 1 according to the present embodiment.

In addition to the above-described media detector 12, physical property measuring unit 13, and image forming operator 14, the image forming apparatus 1 includes, a controller 15 (information obtainer, setting operator), a conveying driver 16a, a storage 17, a communicating unit 41 (instruction obtainer), an operation receiver 42, and a display 43.

As described above, the physical property measuring unit 13 detects the physical properties of the media M, such as basis weight, sheet thickness, and smoothness of the surface (smoothness degree), for example.

The controller 15 centrally controls various operations of the image forming apparatus 1. The controller 15 includes a Central Processing Unit (CPU, processor) and a Random Access Memory (RAM). The controller 15 reads the control program stored in the storage 17 and the CPU executes the program. With this, the controller 15 performs control for the image forming operation by the image forming operator 14, and calibration and setting for the image forming operation. As described later, the controller 15 performs the operation setting process to extract and specify the candidate for the operation setting according to the media M (media type) as the target on which the image is formed, and sets the image forming operation based on the specific result (operation regarding selection of operation setting).

Based on the control by the controller 15, the conveying driver 16a outputs a driving signal to rotate the motor of the conveyor 16 and to perform the operation for supply by the media supplier 11. With this, the conveying operation of the media M is performed and the conveying speed is adjusted.

The storage 17 stores the program 171 executed by the controller 15, the setting data used by the program and the image data regarding the image as the target to be formed by the image forming operator 14. For example, a Hard Disk Drive (HDD) or a non-volatile storage medium such as a flash memory is used as the storage 17. The storage 17 may include a RAM, and the RAM can be used to temporarily store and process some of the data.

Media type information 172 (second information) and operation failure occurrence data 173 (first information) are stored in the storage 17 as setting data.

The media type information 172 shows information regarding the predetermined type of media which is to be the target on which the image is formed, and includes a list showing a product (brand) name, its characteristic information (physical property information) and associated (corresponded) operation setting. The characteristic information of the target media may include, for example, classification information such as normal sheet, high quality sheet, glossy sheet, mat sheet, shiny sheet, etc., and information regarding size. The above can be classified more simply in groups in which the control parameter largely differ, for example, coated sheet such as glossy sheet and mat sheet or non-coated sheet such as normal sheet and high quality sheet. The size does not have to be specified and held if it is not limited. The characteristic information includes some or all parameters (physical property values) as a target of measurement by the physical property measuring unit 13. The characteristic information includes physical property information of the media M, that is, a value (representative value) showing the basis weight, sheet thickness, the surface smoothness, and the like.

If a catalog value of the physical property value of the media M is not stored in advance, the physical property measuring unit 13 can measure the media M when the image is formed and the measured value for one sheet or the average value of the measured values for a plurality of sheets can be added to the media type information 172. When the average value of a plurality of sheets is obtained in successive image forming, the measurement can be performed at different timing such as the beginning, the middle, and near the end of the successive operation. As described later, the operation setting associated to the media type may be used for media other than the media M which is the same brand as the brand defined in the media type information 172. Therefore, it is possible to set that the additional measurement and setting as the physical property value for the media M is performed only for the media M with the same brand.

The media stored in the media type information 172 may include media such as various resin film, stone paper or a medium in which a plurality of types of material are layered. The characteristics of such media greatly differ compared to normal sheet media.

The operation setting associated to the media type may include, for example, driving voltage (or a shifted amount from a value of a driving voltage as a reference) and a fixing temperature (or a shifted amount from a fixing temperature as a reference). The image forming operator 14 performs operation regarding image forming based on control parameters (operation setting) associated to the selected media type. The operation setting data regarding the image forming (control parameter) may include the operation setting parameter for the operation of the media supplier 11 and the post processing apparatus in addition to the operation of the image forming operator 14. Setting for various operation can be performed, for example, degree and limit of pressure in various processes such as sending, sorting, folding, cutting, and stapling of the media M depending on the thickness, hardness, and/or the smoothness of the surface in the media M.

The operation failure occurrence data 173 includes a list associating the contents of the operation failure which occurs when the image is formed (operation failure information) with the characteristic information (physical property information) of the media and the operation setting used when the operation failure occurred. Here, the operation failure is classified between the image failure and the trouble relating to the media M (jamming, clogging), and the number of sheets in which the image is formed and the number of occurrences of the operation failures are calculated for each image forming job (image forming operation instruction), and the data is stored. For the combinations with the same media characteristic and the operation setting, the number of sheets in which the image is formed and the number of occurrences of the operation failures can be added and stored for each combination, instead of for each image forming job.

FIG. 3 is a table showing an example of the operation failure occurrence data 173.

The history data of the operation failure is generated for each job ID and stored. The job ID is a number assigned to each image forming job. A setting ID is an ID of an operation setting (operation profile) set for the image forming based on the media type information 172. Characteristic information is an array of actual physical property values measured by the physical property measuring unit 13. Here, for example, the information includes the following four items, sheet thickness, smoothness, basis weight, and transmittance. Output sheet number is the number of sheets of the media M on which the image is formed set in the job ID. Jam number and image failure number show the number of times the jamming occurred and the number of times the failure image occurred until the number of sheets in the output sheet number is output with the normal images. As described above, the combination of the physical property value of the media used in the image forming is not always the combination which is the same as the combination stored in the media type information 172 associated to the setting ID. In this case, the jamming number and the image failure number may increase.

The communicating unit 41 performs control of communication performed with external devices based on a predetermined communication standard. For example, the communication standard includes TCP/IP (Transmission Control Protocol/Internet Protocol) through LAN (Local Area Network) and the communicating unit 41 includes a network card to perform communication control by LAN. The communicating unit 41 includes a network card to perform communication control by LAN. The communicating unit 41 receives (obtains) data of the image forming job (image forming operation instruction) from the external device and sends the data to the controller 15.

The operation receiver 42 receives the input operation from outside such as the user and outputs the received contents as input signals to the controller 15. For example, the operation receiver 42 includes a touch panel provided overlapped with the display screen of the display 43 and press button switches. The input signals include information regarding pressing operation of the press button switch, and the contact operation and the contact position on the touch panel.

The display 43 displays the display screen based on the control by the controller 15. The display contents include status regarding the image forming operation and the setting menu to receive the input operation from the user. Although not limited, the display screen includes, a liquid crystal display (LCD), an organic EL (Electro Luminescent) display, and the like. The display 43 may include an LED lamp and notify an electric power supply state or an operation error state.

An operation setting determination apparatus according to the present embodiment includes at least the controller 15 and the storage 17 among the above structures. The operation setting determination apparatus can also include the physical property measuring unit 13.

Next, the setting operation regarding the image forming in the image forming apparatus 1 according to the present embodiment is described.

The image forming apparatus 1 performs the image forming operation based on the image forming job. In addition to image data as the target to be formed, the image forming job includes various setting regarding the image forming such as information regarding the number of images to be formed, media size, whether to form the image on both sides, position for allocated printing, margin setting, and the like.

When the image is formed with the image forming apparatus 1, the degree of penetration, fixing, and spreading (smudging) of the color material to the media is different for each type of media on which the image is formed and the characteristic of the media. Therefore, if the image is formed with a uniform operation setting, the image quality of the formed image may be different depending on the media M or the image quality of the formed image worsens compared to the image formed with the suitable operation setting. The unsuitable operation setting may cause trouble such as the media M sticking to the roller of the conveyor 16 and causing jamming, or the color material applied to the media M not being fixed securely and attaching to the surroundings. Therefore, even if the image is formed based on the same image data, various conditions such as the applied amount and the fixing temperature suitable for the color material needs to be changed. In order to form the optimal image based on the image data, in the image forming apparatus 1, the control parameter is changed to a preferable value for each media M type and/or for each characteristic of the media M when the image is processed or when the image forming operation is performed.

In addition, in the image forming apparatus 1, the data regarding the frequency that the operation failure actually occurred due to the control parameter selected in the past is stored. Therefore, when the setting clearly associating to the type of media M is not performed, a setting in which the possibility that trouble occurs is low can be selected from the setting with close characteristics.

FIG. 4A and FIG. 4B are diagrams showing an example of a display screen regarding the operation setting.

As shown in FIG. 4A, when the operation setting according to the media (sheet) is performed (that is, selection of media type), initially, all (plurality of) media are displayed as a list on a list display screen B1 showing the media (sheet) which can be selected (target of selection). A sheet tray selection screen B2 is a screen for selecting the tray in which the media M as the target of setting is stored. A display selection screen B3 is a screen for determining or cancelling the setting of the media M, and receives switching of the display when all media types cannot be displayed on the list display screen.

In the list display screen B1, a screen urging the measuring of the physical properties of the media is displayed overlapped, and "OK" can be selected (for example, predetermined selection using a pointing device, that is, positioning the cursor to a line of a certain media type and clicking with the mouse, or touching the line of the certain media type on the touch panel) to proceed to the measuring operation or "Cancel" can be selected to select the media type directly from the list without performing the operation of measuring. After "OK" is selected and measurement is performed by the physical property measuring unit 13 (media sensor), the screen changes from showing all media types stored in the media type information 172 to a list display screen B4 in which the display (that is, target of selection) is narrowed to those including the physical property measurement results which are similar at a predetermined standard or higher, as shown in FIG. 4B (here, for example, four types (plural)). Even if the name of the product of the media (brand) is well known, the selection becomes easier by narrowing. When one media type from the list display screen B4 and any tray from the sheet tray selection screen B2 are selected and "OK" is selected on the display selection screen B3, the selection is confirmed. As a result of narrowing, if there is only one type which is close, only one type may be displayed or the second closest degree can also be displayed.

When the product name is not known or the product name is known but the operation setting is not stored, the closest one is selected from the candidates displayed in the list. Narrowing is performed with a standard so that there is not a large difference in the image quality no matter which one is selected. Here, if history of performing the image forming operation using the operation setting of the media type displayed in the narrowed list is included in the operation failure occurrence data 173, information regarding the frequency that the media type causes operation failure can be included in the list display. Such information includes, for example, occurrence rate of jamming, occurrence rate of image failure, occurrence of pausing of the image forming operation including those caused by the above trouble and the like.

Figure 5:
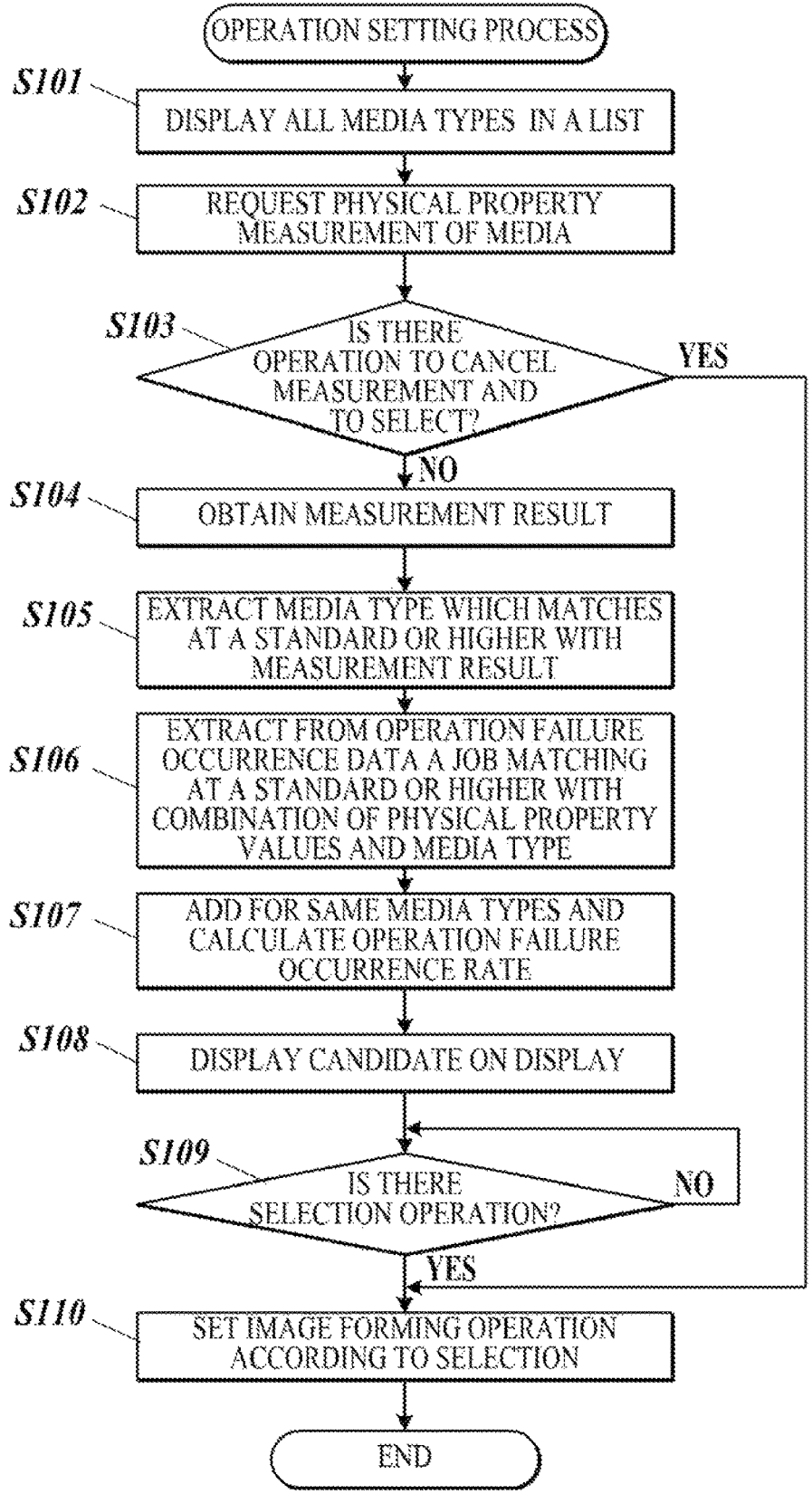
FIG. 5 is a flowchart showing a control process of an operation setting process executed in the image forming apparatus.

FIG. 5 is a flowchart showing a control procedure by the controller 15 when the operation setting process is performed by the image forming apparatus 1 of the present embodiment. The operation setting process includes the operation setting selection method of the present embodiment, and the operation setting process is performed as part of the setting operation corresponding to the image forming job when the image forming job is obtained.

When the operation setting process is started, the controller 15 refers to the media type information 172 and displays a list of all media types (step S101). The controller 15 displays a request to perform physical property measurement of the media (step S102).

The controller 15 determines whether the cancel operation is performed so as not to perform the measurement and whether the operation to directly select the media type is performed (step S103). When it is determined that the media type is directly selected ("YES" in step S103), the process by the controller 15 progresses to step S110, and the setting of the image forming operation according to the selected media type is performed (step S110). Then, the controller 15 ends the operation setting process.

If the cancel operation is not performed and the measurement is approved, the controller 15 outputs the measuring operation instruction to the physical property measuring unit 13. The controller 15 obtains the measurement result from the physical property measuring unit 13 (step S104; physical property obtaining step). The measurement of the physical property value can be performed on only one sheet of the media M or the measurement can be performed on a plurality of sheets and the average value can be obtained.

The controller 15 refers to the media type information 172 and extracts the media type with the measurement result which is similar at a predetermined standard or higher (step S105). The controller 15 refers to the operation failure occurrence data 173 and extracts the failure history data of the job in which the extracted media type and the measurement result are similar at a predetermined standard or higher (step S106; information obtaining step).

When there are a plurality of jobs using the same media type operation setting in the extracted failure history data, the controller 15 adds together (unites) the above, and the occurrence rate of the operation failure (rate for the image failure and rate for the jam occurrence) are calculated for each of the media type operation setting (step S107). The controller 15 displays the list (narrowed display) showing the extracted media type on the display 43 together with the calculated value of the operation failure occurrence rate (step S108).

The controller 15 determines whether the operation receiver 42 received operation of selection (whether operation is performed) (step S109). When it is determined that the operation is not received ("NO" in step S109), the controller 15 repeats the process in step S109. When it is determined that the selection operation is received ("YES" in step S109), the controller 15 performs the operation setting according to the selected media type (step S110). Then, the controller 15 ends the operation setting process. Here, following the end of the operation setting (selection of media type), the controller 15 can continue to perform the process to control the image forming operator 14 to start the image forming operation. Alternatively, the controller 15 can perform each of the operation setting and the actual start of the operation based on a separate input operation.

At least some of the processes in steps S107 to S110 are included in the setting operation step in the operation setting selection method according to the present embodiment.

FIG. 6 is a diagram showing a modification of the first display screen regarding the operation setting.

According to the modification, even if the physical property measurement value is not measured, in the list display screen B1a, the occurrence rates of the operation failure in the image forming operation performed in the past for all media types are displayed. In this case, the information show whether the operation failure tends to occur generally regardless of the physical properties of the media M used in the present image forming.

Figure 8:
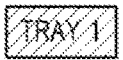
FIG. 8 is a diagram showing a modification of a display screen after narrowing media type.

FIG. 7A, FIG. 7B, and FIG. 8 are diagrams showing a modification of the display screen when the media types are narrowed based on the physical property measurement values. Displayed here is an automatic selection screen B5 to make an automatic selection from the list display screen B4 based on a predetermined standard (set selection standard).

The automatic selection screen B5 includes three types such as "priority on quality", "priority on efficiency", and "recommended setting". In FIG. 7A, the operation to select "priority on quality" is performed, and setting ID "0003" which has the smallest image failure rate among the media types displayed as a list is displayed highlighted as the selection target. In FIG. 7B, the operation to select "priority on efficiency" is performed, and setting ID "0012" among the media types displayed as a list is displayed highlighted as the selection target. The standard for automatic selection based on efficiency can be suitably determined, and may simply be the unit price for each sheet or may be determined according to the various specs or the type of image to be formed (text, color figures, images, etc.).

In FIG. 8, the operation to select "recommended setting" is performed, and setting ID "0104" among the media types displayed as a list is displayed highlighted as the selection target. A loss estimate screen B6 is also displayed showing an estimate of losses as the losses in the amount of sheets of media M and the costs (cost of loss) according to the losses in the amount of sheets due to the frequency of operation failure occurring estimated from past history when the image is formed in the number of sheets (output number of sheets) set in the image forming job according to the operation setting of the setting ID displayed with highlight. The losses in the amount of sheets is obtained by multiplying the frequency of occurrence of the operation failure by the number of output sheets in the present image forming job. The cost of loss is obtained by further multiplying the losses in the amount of sheets by the costs for each sheet of media (unit cost). The candidate in which the costs of the losses becomes smallest can be selected as the recommended setting.

The automatic selection standard selected in response to operation received on the operation receiver 42 can be stored in the storage 17 and can be used as a default setting when operation is set thereafter (continued use is possible). Alternatively, setting may be necessary each time. When the user allows automatic selection with the same standard each time, default setting is set and there is no need for selection operation on the automatic selection screen B5. When the user allows automatic selection with another standard, the user makes selections regarding the other items on the automatic selection screen B5 again.

Figure 9:
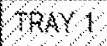
FIG. 9 is a diagram showing an example of an executing confirmation screen when the media type is selected.

FIG. 9 is a diagram showing an example of an execution confirmation screen when the media type is selected on the operation setting screen in which the media type is narrowed. When "OK" is selected in the display selection screen B3, the information regarding the media type (operation setting) selected in a confirmation contents screen B7 and setting contents of the image forming job are displayed as a list. When "execute job" is selected on a selection screen B9, the process to execute the image forming job starts. In this execution confirmation screen, it is determined whether there is a candidate in which the estimated cost of loss is smaller than the selected media type (whether it is minimum) When there is a candidate in which the cost of loss is smaller, a caution display B8 showing that there is a media type in which the costs will be minimum can be displayed (display of result of determination). Here, when the operation setting regarding the media type with the setting ID "0003" is selected, it is estimated that the cost of loss will become smaller if setting ID "0104" is selected. Therefore, this result and a display button to change the setting to the setting ID "0104" are shown.

When the display button to change the setting is selected, the screen can be switched to the confirmation screen of the operation setting based on the changed setting ID. Alternatively, "cancel" can be selected on the selection screen B9 and the display can be returned to the list display screen B4 in which the candidates are narrowed.

Figure 10:
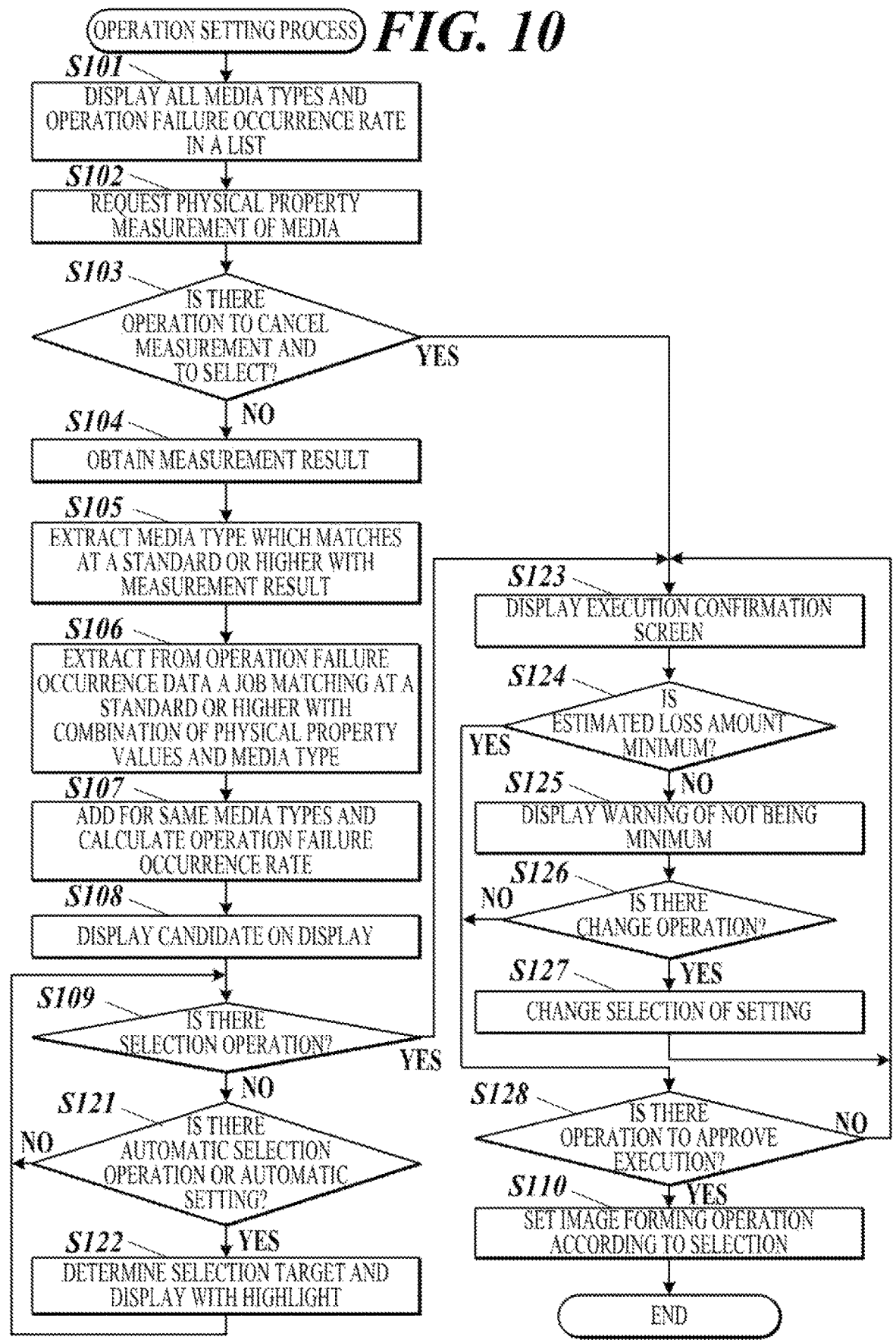
FIG. 10 is a flowchart showing a control process of a modification of an operation setting process according to a modification of display contents in the display screen.

FIG. 10 is a flowchart showing a modification of a control procedure for the operation setting process according to the above modification of the display screen.

In this operation setting process, steps S121 to S128 are added to the operation setting process according to the above-described embodiment. The contents of the processes which are the same as the above-described embodiment are described using the same reference numerals and the description is omitted. In the process of step S101, the displayed contents can be changed as shown in FIG. 6.

In the determination process in step S103, when it is determined that there is an operation to cancel measurement and to directly select one from the media types displayed as a list ("YES" in step S103), the process by the controller 15 proceeds to step S123.

In the determination process in step S109, when it is determined that there is no selection of the media type ("NO" in step S109), the controller 15 determines whether there is an operation to select a type of the automatic selection or there is a setting for automatic selection (step S121). When it is determined that there is no selection or setting is not performed ("NO" in step S121), the process in the controller 15 returns to step S109. When it is determined that there is an operation to select a type of the automatic selection or the automatic selection is set ("YES" in step S121), the controller 15 determines the best media type for the standard according to the selection operation as the selection target, and displays the media type with highlight (step S122). When there is operation for automatic selection, the controller 15 can store the type of automatic selection as the setting for automatic selection in the storage 17. Then, the process of the controller 15 returns to step S109.

In the determination process in step S109, when it is determined that there is a selection operation of the media type ("YES" in step S109), the controller 15 controls the display 43 to display an execution confirmation screen (step S123). The controller 15 determines whether the estimated cost of loss of the media due to operation failure according to the selected media type is the minimum among the narrowed candidates (step S124). When it is determined to be the minimum ("YES" in step S124), the process by the controller 15 proceeds to step S128. When the narrowing in the determination process in step S103 is not performed and the process proceeds to step S123, or there is only one candidate after narrowing the media type, the flow can automatically proceed to "YES" in the process in step S124 without considering the other media types which are not selected.

When it is determined that the cost of loss is not minimum ("NO" in step S124), the controller 15 controls the display 43 to display on the display screen the caution display B8 showing that there is a possibility that the cost of loss is not the minimum (step S125). The controller 15 determines whether the operation to change the setting is received (step S126). When it is determined that there is no operation to change the setting ("NO" in step S126), the process by the controller 15 proceeds to step S128.

When it is determined that the operation to perform setting change is received ("YES" in step S126), the controller 15 changes the set media type (step S127). The controller 15 returns the process to step S123 and displays the execution confirmation screen again.

When the process proceeds from steps S124 and S126 to step S128, the controller 15 determines whether the operation to approve the execution of the image forming job is performed (selection of "execute job" button) (step S128). When it is determined that the operation to approve the execution of the image forming job is not received ("NO" in step S128), the process by the controller 15 returns to step S123. When it is determined that the operation to approve the execution of the image forming job is received ("YES" in step S128), the process by the controller 15 proceeds to step S110 Similar to the above-described embodiment, after the process in step S110 is performed and the operation setting process ends, the controller 15 can then go on to control the image forming operator 14 to start the image forming operation.

Figure 11:
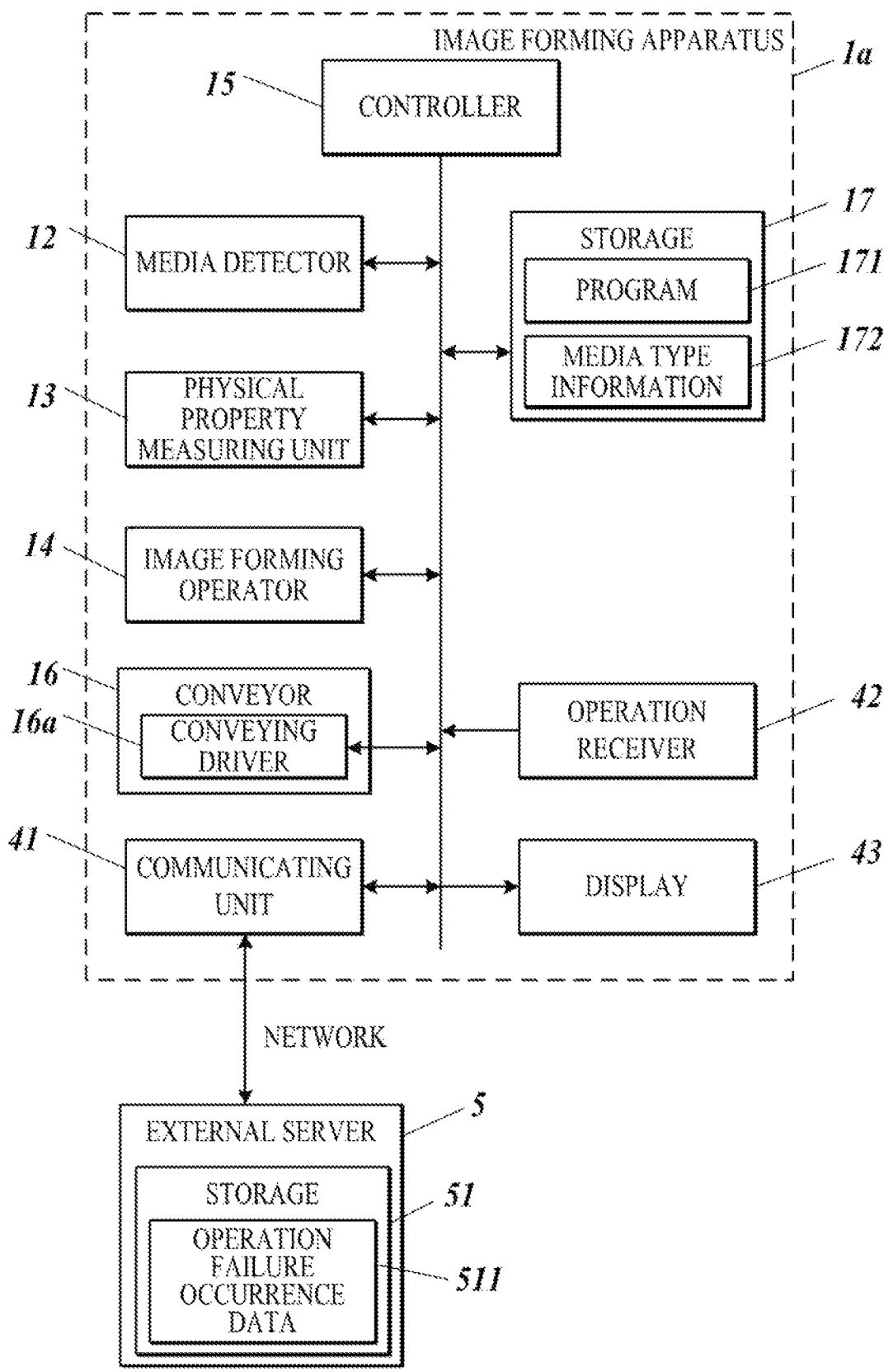
FIG. 11 is a block diagram showing a modification of a functional configuration of an image forming apparatus.

FIG. 11 is a block diagram showing a modification of the function configuration of the image forming apparatus.

The image forming apparatus 1a according to the modification does not store the operation failure occurrence data 173 in the storage 17 of the image forming apparatus 1a. The data is stored as operation failure occurrence data 511 in a storage 51 on an external server 5 which can be accessed through a network. The external server 5 may be a server in a management company for the image forming apparatus 1a, and can be a cloud server, for example. In this case, the information of operation failure which occurs in the same type of image forming apparatus existing in various areas is transmitted to the external server 5 and is managed unitarily. When the setting of the media type is performed in the image forming apparatuses 1a, the apparatus accesses to the external server when the media types are narrowed, and obtains information of the operation failure regarding the narrowed media types. That is, the image forming apparatus 1a can obtain from the external server 5 information regarding combinations of media types and operation settings which have never been used in the image forming apparatus 1a, and the information can be used as information for operation setting.

When the setting of the media type is performed in the image forming apparatus 1a, the operation failure occurrence data 511 does not have to be obtained for only necessary portions each time the information is actually necessary. All of the data can be obtained as necessary or periodically when the image forming operation is paused or during standby time, and such information can be stored as the operation failure occurrence data 173 in the storage 17, similar to the above-described embodiment and used.

The data regarding the operation failure occurrence can be sent to the external server 5 each time the job regarding the image forming ends in the image forming apparatus 1a. After the data is suitably processed, the data can be added as public data open to other image forming apparatuses.

As described above, the image forming apparatus 1 according to the present embodiment includes a physical property measuring unit 13 which obtains the physical property information of the media M in which the image is formed, and a controller 15. The controller 15 functions as the information obtainer and obtains from the operation failure occurrence data 173 in which operation failure information regarding contents of the operation failure occurring during the image forming operation is associated with the operation setting regarding the physical property information of the media used when the operation failure occurs and the operation setting regarding image forming, the operation setting and the operation failure information associated to the physical property information obtained by the physical property measuring unit 13. The controller 15 functions as the setting operator and performs operation regarding the selection of the operation setting regarding the operation to form an image on the media M based on the physical property information, the operation setting, and the operation failure information which are obtained.

As described above, the information regarding occurrence of operation failure in the past can be reflected to the operation setting. Therefore, if there is no corresponding official operation setting or the setting is not clear for the media M to be used, it is possible to easily select the suitable operation setting based on experience from the history of image forming operations performed in the past. With this, in the image forming apparatus 1, unnecessary operation trouble which may occur while forming an image on the media M can be effectively suppressed. Further loss of the media M due to trouble can be suppressed.

The image forming apparatus 1 includes a storage 17 which stores media type information 172 which associates physical property information of predetermined media with operation setting regarding the image forming. The controller 15 functions as the setting operator and performs operation regarding selection from a plurality of operation settings associated to the physical property information obtained by the physical property measuring unit 13 as stored in the media type information 172. That is, while referring to the history of the operation trouble, the more preferable operation setting can be selected from the plurality of known media types which have physical properties close to the actual physical properties of the media M used in the image forming. Therefore, the occurrence of operation trouble can be suppressed more effectively, and image forming is possible with suitable image quality.

According to the image forming apparatus 1, operation failure occurrence data 173 is stored in the storage 17. As described in the modification, such operation failure occurrence data 173 can be suitably obtained from an external server 5 used commonly with other image forming apparatuses and updated. Since the data is stored in the apparatus, there is no need to consider time lag due to communication, and the operation failure information regarding the candidate of the media type extracted based on the obtained physical property value can be immediately obtained. Therefore, it is possible to display a list including the information regarding the operation failure for such candidate.

The controller 15 functions as the setting operator, and extracts from the media type information 172 the operation setting (media type) associated to the physical property information similar at a predetermined standard or higher with the physical property information obtained by the physical property measuring unit 13, and narrows the target of selection. The media type information 172 may store operation settings regarding a large number of media, but the similar operation settings are mechanically extracted based on the actual measurement value of the physical properties. Therefore, the operation settings which are impossible to use can be easily omitted. According to such extraction process, the burden of referring to history data regarding operation trouble can be reduced.

The image forming apparatuses 1 and 1*a* include an operation receiver 42. The controller 15 functions as the setting operator and uses the operation receiver 42 to receive the operation of selecting one from the operation settings (media type) which are a plurality of targets for selection. As described above, the user makes the final determination and therefore the setting can be suitably performed considering image quality and unit cost of the media while also considering degree of occurrence of operation trouble.

Alternatively, the controller 15 functions as the setting operator, and based on the selection standard set regarding image quality and costs, one is selected from the operation settings (media type) which are a plurality of targets for selection. That is, by setting the selection standard, even if the user does not make a selection manually, the optimal selection regarding costs of loss can be made easily and objectively.

The controller 15 functions as the setting operator, and determines a selection standard according to the operation contents received on the operation receiver 42. Consequently, when the user performs input operation through the operation receiver 42, it is possible to easily set the preferable selection standard.

The controller 15 functions as the setting operator and is able to continuously use the selection standard determined based on operation contents. When the same selection standard is often used each time, once the setting is performed, there is no need to perform the setting again. Therefore, the burden of input operation by the user can be cut and mistakes in setting can also be prevented.

The image forming apparatuses 1 and 1*a* include a display 43. The controller 15 functions as the setting operator, and based on the operation failure occurrence data 173, obtains the information regarding the frequency of occurrence of operation failure when the image forming operation is performed due to the combination of each of the plurality of operation settings (media type) as the target of selection and the physical property information obtained by the physical property measuring unit 13. The controller 15 displays the obtained data on the display 43. As described above, the operation settings for the selection candidates are displayed as a list, and the display as a list includes information regarding frequency of occurrence of operation failure. Therefore, the user is able to easily select the preferable media type (operation setting) while considering the degree of occurrence of the operation failure.

The operation failure occurrence data 173 is stored for each operation instruction (job) of image forming. The controller 15 functions as the setting operator, and combines the plurality of operation failure information regarding the same operation setting among the obtained operation failure occurrence data 173. The controller 15 displays the information on the display 43. That is, if the image forming is performed a plurality of times in the past on the same media with the same operation setting, the accumulated information regarding the occurrence of the operation failure is displayed, and the user can be notified with average operation failure information with high accuracy. Moreover, if the information regarding the total number of output sheets is included so that it is possible to know that the image forming is performed repeatedly many times with the same setting, the user is able to easily understand that the reliability of the operation setting is high.

The controller 15 functions as the instruction obtainer and obtains the operation instruction to perform image forming (job data). Such job data includes information regarding the number of sheets of media in which the image is formed. The controller 15 functions as the setting operator and estimates the number of sheet loss of the media M regarding the plurality of the operation settings as the target of selection based on the information regarding the frequency of occurrence of the operation failure. The result is displayed on the display 43. That is, it is possible to specifically estimate the actual number of sheets of media M that are counted as the loss due to the operation failure. Therefore, it is easier to determine whether the selection of the operation setting is reasonable.

The media type information 172 includes information regarding the unit cost of the media M. The controller 15 functions as the setting operator and estimates the cost of loss of the media M based on the information regarding the frequency of occurrence of the operation failure for the plurality of operation settings (media type) as the target of selection. The result is displayed on the display 43. As described above, the user is able to easily consider the cost regarding the loss of the media M due to operation failure when the operation setting is determined. Therefore, it is easier to suitably select the operation setting.

The controller 15 functions as the setting operator. When one operation setting (media type) is selected, the controller 15 determines whether the estimated loss of the media M for the image forming operation according to the operation setting is minimum among the plurality of selection targets, and displays the result of determination on the display 43. With this, before the actual image forming operation starts, the user is able to determine the optimal operation setting from the viewpoint of cost. Therefore, the user is able to easily reconsider the setting or is able to confirm the standard which is considered in the selection such as the standard, priority on image quality regardless of costs.

The operation failure includes at least one of jamming, image failure and pausing of the image forming operation. There are a plurality of reasons for operation failure, and the reasons may be displayed according to the reason or the reasons can be collectively displayed, and the reasons can be displayed depending on the image forming apparatuses 1 and 1a or depending on the user. With this, the convenience for the user is enhanced.

The image forming apparatuses 1 and 1a include a physical property measuring unit 13 which measures the predetermined physical property value as the physical property information. Since the measurement is performed in-line by the physical property measuring unit 13 included in the image forming apparatuses 1 and 1a, the user can easily obtain the physical property information of the media M by simply setting the media M and sending the measuring instruction.

In addition to the above configuration, the image forming apparatuses 1 and 1a include an image forming operator 14 which performs the image forming on the media M with the selected operation setting. That is, the image forming apparatuses 1 and 1a can easily select and set the operation setting which is preferable for the apparatus. Therefore, the image can be suitably formed on various media M while considering the degree of occurrence of operation trouble.

The operation setting selection method according to the present embodiment includes a physical property obtaining step which obtains physical property information of the media M and a setting operation step which performs operation regarding the selection of the operation setting based on the obtained physical property information and the operation setting and the operation failure information associated to the physical property information in the operation failure occurrence data 173 stored in the storage 17. According to such operation setting selection method, when using a media M in which the optimal operation setting is unknown, the suitable operation setting can be easily selected considering the operation trouble which actually occurred in the past. With this, unnecessary occurrence of trouble in the operation regarding the media M when the image is formed can be suppressed more effectively. Further, the loss of the media M due to such trouble can also be suppressed. Alternatively, according to the modification, the operation failure occurrence data 173 does not have to be stored in the image forming apparatus 1, and the abnormality occurrence history can be used commonly among a plurality of image forming apparatuses. With this, the data for many image forming operations can be collected efficiently, and this can be reflected in the setting of the image forming apparatuses 1.

The present invention is not limited to the above embodiments, and various changes can be made.

For example, according to the above embodiment, the physical property information of the media M as the target of image forming is obtained from the physical property measuring unit 13 or an external physical property measuring unit. Alternatively, data of the physical property information from external devices can be input to the communicating unit 41, or the user can input the physical property data through the operation receiver 42. In these cases, the communicating unit 41 and/or the operation receiver 42 function as the physical property obtainer.

According to the above-described embodiment, the operation trouble regarding image failure and the trouble regarding conveying media M such as jamming are each counted, stored, and output. Alternatively, since image failure also depends on the state of the image forming operator 14, only the trouble regarding conveying may be calculated to estimate the loss of sheets. Alternatively, the pausing occurrence rate of the image forming operation can be displayed and the loss of sheets can be estimated based on the above.

Alternatively, the trouble caused such as jamming when the image is formed on only one side and the trouble caused when the image is formed on both sides can be counted separately and displayed.

According to the present embodiment, both the loss of sheets and loss of costs can be calculated, and the automatic selection is made so that the loss of cost is minimum. Alternatively, only the loss of sheets may be estimated and the automatic selection (recommended setting) can be made so that the loss of sheets is minimum.

According to the present embodiment, three types of automatic setting standards which are priority on quality, priority on efficiency, and recommended setting can be selected, but standards other than the above can be used for automatic setting. Moreover, the standard for automatic setting is not limited to those determined when the media type is selected, and setting can be made in advance in a separate setting screen.

The display of the loss of sheets and/or the loss of costs in the confirmation display screen can be displayed only when the media type (operation setting) is selected manually and the display can be omitted in the automatic setting.

Alternatively, the setting to perform the automatic selection of the media type (operation setting) can be performed in advance, and the process regarding the setting can be completed without displaying the occurrence rate of the operation failure and the loss as a list. In this case, opposite to the above, the loss of sheets and/or the loss of costs may be displayed only in the confirmation display screen.

In the manual selection also, the occurrence rate of the operation failure does not have to be displayed in the display of the candidate list, and occurrence rate may be displayed only for the selected candidate.

According to the present embodiment, the price for each sheet of media is stored, but the price may be stored for a unit of any number of sheets (for example, 100 sheets).

According to the present embodiment, the operation setting is stored associated one to one with the media type, but the relation does not have to be one to one. One operation setting may be associated with a plurality of media types or a plurality of types of operation settings can be included as candidates for one media type.

According to the present embodiment, the controller 15 of the image forming apparatus 1 performs the operation setting. Alternatively, a computer outside the image forming apparatus 1 can determine the operation setting, and the determined information can be sent to the image forming apparatus.

The specific details of the configuration, process contents, and process steps as described in the above embodiments can be suitably modified without leaving the scope of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An operation setting selection apparatus comprising:
a physical property obtainer which obtains physical property information of a recording medium on which an image is formed by physically measuring physical quantities associated with physical properties of the recording medium;
a storage that stores first information, wherein said first information includes a list that associates (i) operation failure information regarding contents of operation failure which occurs when an image forming operation is performed with (ii) the physical property information of the recording medium used when the operation failure occurs and an operation setting regarding the image forming; and
a hardware processor,
wherein,
the hardware processor obtains from the first information stored in the storage the operation setting and the operation failure information associated to the physical property information measured by the physical property obtainer, and
the hardware processor performs operation regarding selection of the operation setting regarding the image forming operation on the recording medium based (i) on the physical property information, (ii) the operation setting, and (iii) the operation failure information, which are obtained.

2. The operation setting selection apparatus according to claim 1, wherein the storage further stores second information in which physical property information of a predetermined recording medium is associated to an operation setting regarding image forming,
wherein, the hardware processor performs operation regarding the selection from the plurality of operation settings associated to the obtained physical property information in the second information.

3. The operation setting selection operation according to claim 2, wherein, the hardware processor extracts from the second information the operation setting associated to the physical property information which is similar to the physical property information obtained by the physical property obtainer at a predetermined standard or higher to narrow the target of selection.

4. The operation setting selection apparatus according to claim 1, further comprising an operation receiver,
wherein, the hardware processor receives an operation on the operation receiver to select one operation setting from the plurality of operation settings as targets of selection.

5. The operation setting selection apparatus according to claim 1, wherein, the hardware processor selects one operation setting from the plurality of operation settings as targets of selection based on a set selection standard.

6. The operation setting selection apparatus according to claim 5, further comprising an operation receiver,
wherein, the hardware processor determines the selection standard according to contents of operation received on the operation receiver.

7. The operation setting selection apparatus according to claim 6, wherein, the hardware processor is able to continuously use the selection standard determined based on the contents of operation.

8. The operation setting selection apparatus according to claim 1, further comprising a display,
wherein, the hardware processor obtains based on the first information, information regarding occurrence frequency of operation failure when the image forming operation is performed according to a combination of each one of the plurality of operation settings as the target of selection with the physical property information obtained by the physical property obtainer, and the hardware processor displays the obtained information on the display.

9. The operation setting selection apparatus according to claim 8, wherein,
the first information is generated for each operation instruction of image forming, and
when the information is obtained from the first information, the hardware processor combines the plurality of operation failure information with the same operation setting and displays the combined information on the display.

10. The operation setting selection apparatus according to claim 8, wherein,
the hardware processor obtains an operation instruction for image forming,
the operation instruction includes information regarding a number of sheets of recording media in which an image is formed, and
the hardware processor estimates a loss of sheets of the recording media based on information regarding frequency of occurrence of the operation failure for the plurality of operation settings as the targets of selection, and the hardware processor displays the loss of sheets on the display.

11. The operation setting selection apparatus according to claim 8, wherein the storage further stores second information in which physical property information of a predetermined recording medium is associated to the operation setting regarding image forming,
wherein, the second information includes information regarding a unit price of the recording medium, and
the hardware processor estimates a loss of cost of the recording medium based on information regarding frequency of occurrence of the operation failure for the plurality of operation settings as the targets of selection, and the hardware processor displays the loss of cost on the display.

12. The operation setting selection apparatus according to claim 8, wherein when one of the operation settings is selected, the hardware processor determines whether the loss of the recording media estimated for the image forming operation by the operation setting is minimum among the plurality of targets of selection, and the hardware processor displays a result of the determination on the display.

13. The operation setting selection apparatus according to claim 1, wherein the operation failure includes at least one among jamming, image failure, and pausing of an image forming operation.

14. An image forming apparatus comprising:
an operation setting selection apparatus according to claim 1, and a forming operator which forms an image on a recording medium with a selected operation setting.

15. An operation setting selection method in which an operation setting for an image forming apparatus is selected according to a recording medium in which an image is formed, the method comprising, obtaining, by a physical property obtainer, physical property information of the recording medium by physically measuring physical quantities associated with physical properties of the recording medium, storing, by a storage, first information, wherein said first information includes a list that associates (i) operation failure information regarding contents of operation failure which occurs when an image forming operation is performed with (ii) the physical property information of the recording medium used when the operation failure occurs and an operation setting regarding the image forming, obtaining, by a hardware processor, from the first information stored in the storage the operation setting and the operation failure information associated with the obtained physical property information, and performing, by the hardware processor, operation regarding selection of the operation setting regarding the image forming operation on the recording medium based on (i) the physical property information, (ii) the operation setting, and (iii) the operation failure information which are obtained.

* * * * *